US009139164B2

United States Patent
Shido et al.

(10) Patent No.: US 9,139,164 B2
(45) Date of Patent: Sep. 22, 2015

(54) ARM HEAD (75) Inventors: Toshio Shido, Hamamatsu (JP); Noboru Ishida, Kawagoe (JP)

(73) Assignees: Asmo Co., Ltd., Kosai-shi, Shizuoka-ken (JP); Nippon Wiper Blade Co., Ltd., Kazo-shi, Saitama-ken (JP)

( * ) Notice: Subject to any disclaimer, the term of this patent is extended or adjusted under 35 U.S.C. 154(b) by 674 days.

(21) Appl. No.: 13/413,337

(22) Filed: Mar. 6, 2012

(65) Prior Publication Data

US 2012/0230756 A1 Sep. 13, 2012

(30) Foreign Application Priority Data

Mar. 9, 2011 (JP) ................................. 2011-051429
Dec. 27, 2011 (JP) ................................. 2011-286774

(51) Int. Cl.
*B60S 1/34* (2006.01)

(52) U.S. Cl.
CPC .............. *B60S 1/345* (2013.01); *B60S 1/3438* (2013.01); *Y10T 403/32951* (2015.01)

(58) Field of Classification Search
CPC ...... B60S 1/3436; B60S 1/3438; B60S 1/345; B60S 1/3459; F16C 11/00; F16C 11/0614; Y10T 403/32951
USPC ........... 15/250.351, 250.352, 250.31, 250.46; 403/161, 263
See application file for complete search history.

(56) References Cited

U.S. PATENT DOCUMENTS

| 3,099,030 | A | * | 7/1963 | Zury ........................ 15/250.352 |
| 3,748,685 | A | * | 7/1973 | Edele et al. ............. 15/250.352 |
| 3,760,452 | A | * | 9/1973 | Edele ...................... 15/250.352 |
| 4,932,097 | A | * | 6/1990 | Kobayashi et al. ........ 15/250.34 |
| 4,938,086 | A | | 7/1990 | Nolte et al. |
| 5,553,962 | A | * | 9/1996 | Eustache ...................... 403/154 |
| 6,119,301 | A | | 9/2000 | Nakatsukasa et al. |
| 2003/0028992 | A1 | * | 2/2003 | Zimmer ................... 15/250.351 |
| 2003/0145413 | A1 | | 8/2003 | Zimmer |
| 2004/0037631 | A1 | * | 2/2004 | Vermeulen ..................... 403/315 |
| 2006/0254018 | A1 | * | 11/2006 | Losch ...................... 15/250.351 |
| 2007/0209137 | A1 | | 9/2007 | Lipps et al. |
| 2008/0201892 | A1 | | 8/2008 | Fujiwara et al. |

FOREIGN PATENT DOCUMENTS

| CN | 1942351 A | | 4/2007 |
| EP | 1 008 500 A2 | | 6/2000 |
| GB | 1180177 | * | 2/1970 |
| HU | 207817 B | * | 6/1993 |
| JP | H11-180258 | | 7/1999 |
| JP | 2000-018254 A | | 1/2000 |

(Continued)

*Primary Examiner* — Gary Graham
(74) *Attorney, Agent, or Firm* — Christensen Fonder P.A.

(57) ABSTRACT

An arm head includes an end portion to which a retainer is pivotally coupled and a surface covered by a coating. The end portion includes a coupling bore. The coupling bore includes an open end. First and second surfaces of the arm head form an annular recess around the open end that extends continuously from the open end. The radial outer surface extends outward in a radial direction from the annular recess. The first surface extends outward in the radial direction from the open end. The first surface is located inward in an axial direction of the coupling bore from the radial outer surface. The second surface extends from the first surface to the radial outer surface at an angle less than 180° with respect to the first surface.

14 Claims, 7 Drawing Sheets

(56) References Cited

FOREIGN PATENT DOCUMENTS

| JP | 2001-063530 A | 3/2001 |
| JP | 2003/182529 A | 7/2003 |
| JP | 2007-501152 A | 1/2007 |
| JP | 2008-213549 A | 9/2008 |
| WO | WO 02/090154 A1 | 11/2002 |
| WO | WO 2005/016713 A1 | 2/2005 |

* cited by examiner

ARM HEAD

CROSS-REFERENCE TO RELATED APPLICATIONS

This application is based upon and claims the benefit of priority from prior Japanese Patent Application No. 2011-051429, filed Mar. 9, 2011, and claims the benefit of priority from prior Japanese Patent Application No. 2011-286774, filed Dec. 27, 2011, the entire contents of which are both incorporated herein by reference.

BACKGROUND OF THE INVENTION

The present invention relates to an arm head of a wiper arm.

A typical wiper arm includes an arm head and a retainer. The arm head includes a distal portion with respect to the longitudinal direction. A coupling bore extends through the distal portion in a direction orthogonal to the longitudinal direction. The retainer is coupled to the arm head and is pivotal about a shaft inserted through the coupling bore. An anti-glare and rust resistant coating is applied to the wiper arm to prevent light reflection and metal corrosion.

The retainer is formed by bending a steel plate into a U-shape. After bending the steel plate, it is difficult to coat the inner side of the retainer. Thus, for example, one side of the steel plate is coated in advance. In this case, the steel plate is bent so that the coated surface is arranged at the inner side. Then, the outer side of the steel plate is coated so that the retainer is entirely coated to prevent metal corrosion (refer to, for example, Japanese National Phase Laid-Open Patent Publication No. 2007-501152).

Figure 14:
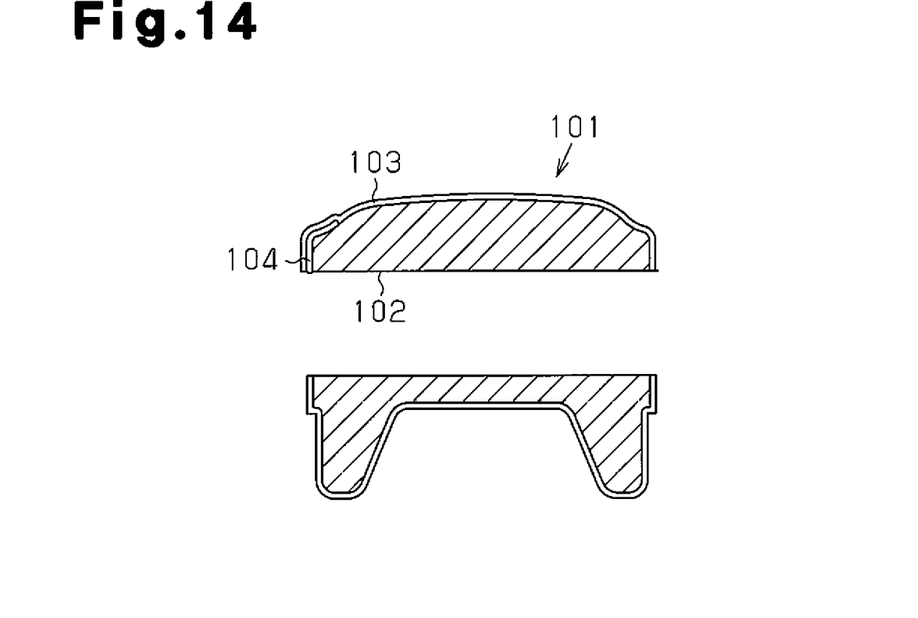
FIG. 14 is a partially enlarged cross-sectional view showing an arm head of the prior art.

The coupling bore of the arm head receives the shaft. Thus, the coating is not applied to the wall of the coupling bore. For example, as shown in FIG. 14, an arm head 101 includes a coupling bore 102, and a coating 103 is applied to the arm head 101 but not to the wall of the coupling bore 102. In this case, a corrosion product 104 may form inside the coating 103 on the arm head 101 near the open end of the coupling bore 102. As corrosion advances, the corrosion product 104 may expand or separate the coating 103. Such a corroded portion would stand out and adversely affect the outer appearance of the arm head prematurely.

SUMMARY OF THE INVENTION

It is an object of the present invention to provide an arm head capable of preventing a corrosion product from growing and preventing its outer appearance from deteriorating prematurely.

One aspect of the present invention is an arm head including a longitudinal end portion to which a retainer is pivotally coupled and a surface covered by a coating. The end portion includes a coupling bore. The retainer is pivotal relative to the arm head about an axis of a shaft extending through the coupling bore. The coupling bore includes an open end that opens outward from the arm head. The arm head includes first and second surfaces forming an annular recess around the open end and a radial outer surface. The annular recess extends continuously from the open end. The radial outer surface extends outward in a radial direction from the annular recess. The first surface extends outward in the radial direction from the open end. The first surface is located in the arm head inward in an axial direction of the coupling bore from the radial outer surface. The second surface extends from the first surface to the radial outer surface at an angle less than 180° with respect to the first surface.

A further aspect of the present invention is an arm head covered by a coating and pivotally coupled by a shaft to a retainer. The arm head includes a coupling bore into which the shaft is fitted. The coupling bore includes an open end that opens outward from the arm head. Annular first and second surfaces form an annular recess around the open end. The annular recess is continuously from the open end. A radial outer surface extends outward in a radial direction from the annular recess. The first surface extends outward in the radial direction from the open end. The first surface is located in the arm head inward in an axial direction of the coupling bore from the radial outer surface. The second surface extends from a radially outer edge of the first surface to a radially inner edge of the radial outer surface at an angle less than 180° with respect to the first surface.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
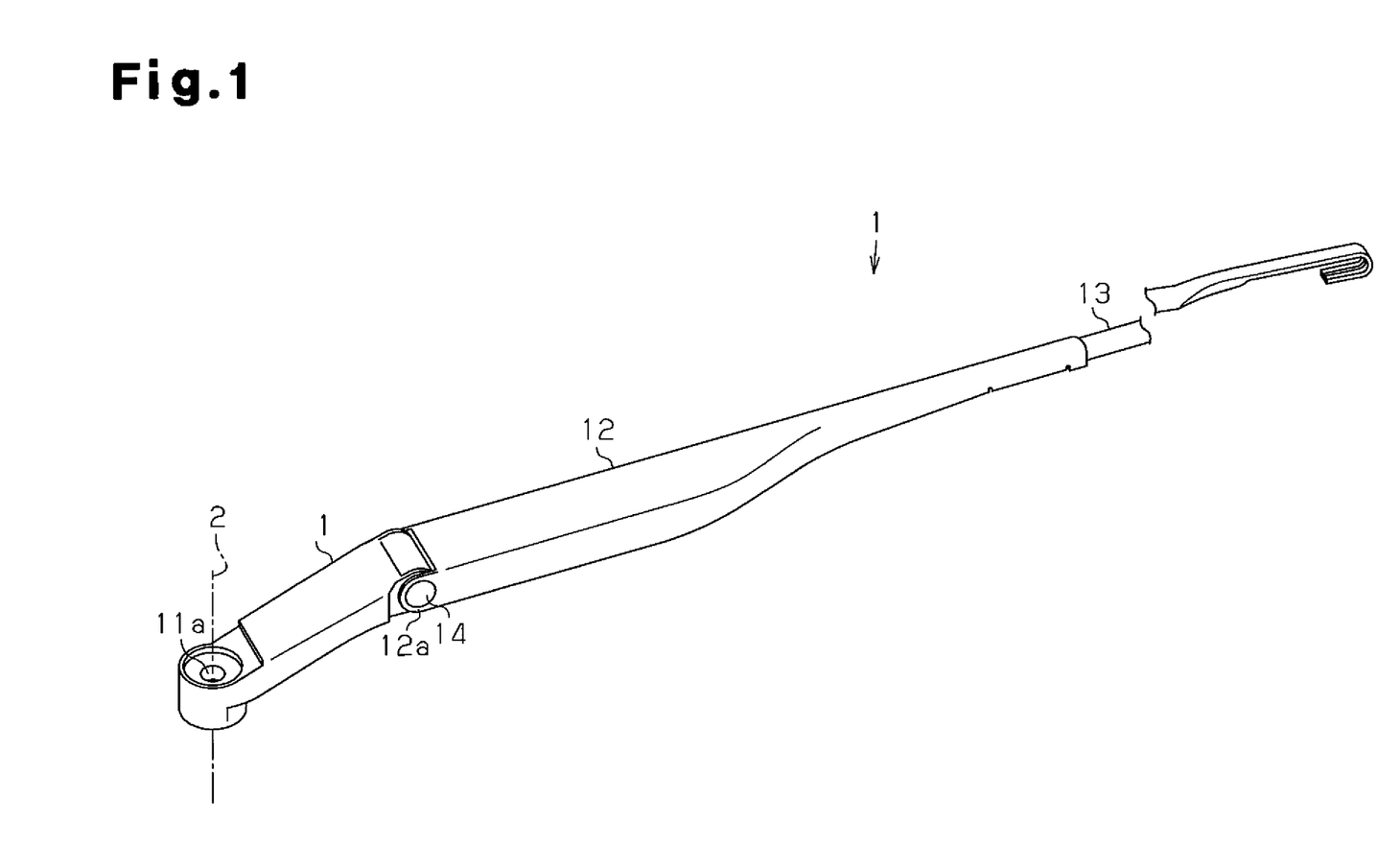
FIG. 1 is a perspective view showing a wiper arm according to one embodiment of the present invention.

One embodiment of the present invention will now be described with reference to FIGS. 1 to 5. As shown in FIG. 1, a wiper arm 1 includes a basal portion, which is fixed to a pivot shaft 2 (schematically shown by a broken line) arranged in the vicinity of a lower end of the windshield of a vehicle, and a distal portion, to which a wiper blade (not shown) is coupled. The wiper arm 1 is formed by coupling an arm head 11, a retainer 12, and an arm piece 13 from the basal side.

Figure 2:
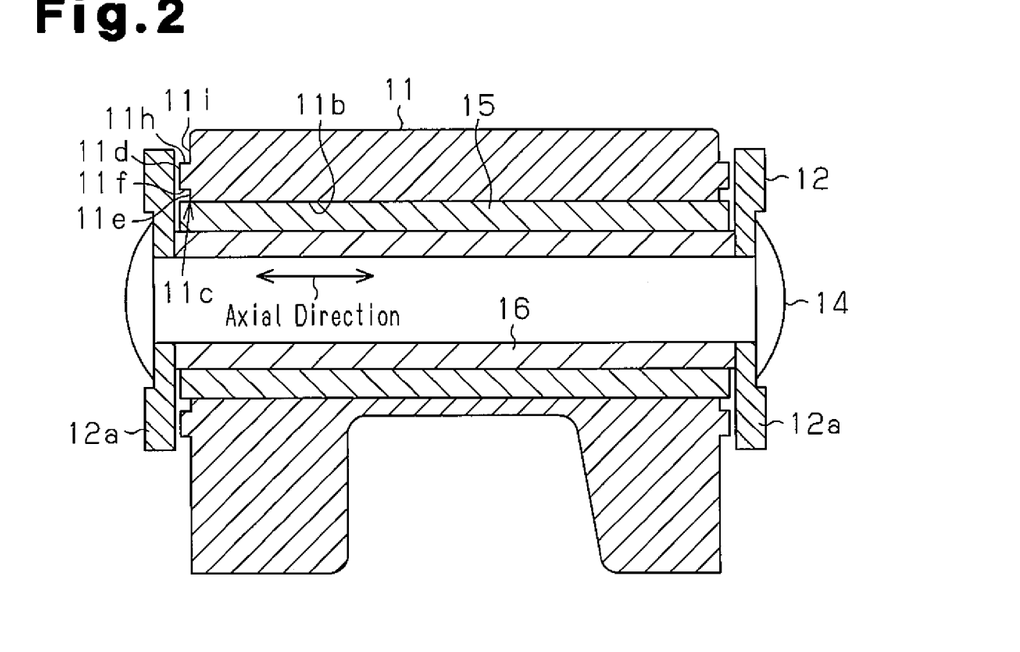
FIG. 2 is a cross-sectional view showing a coupling portion of an arm head and a retainer of FIG. 1.
Figure 3:
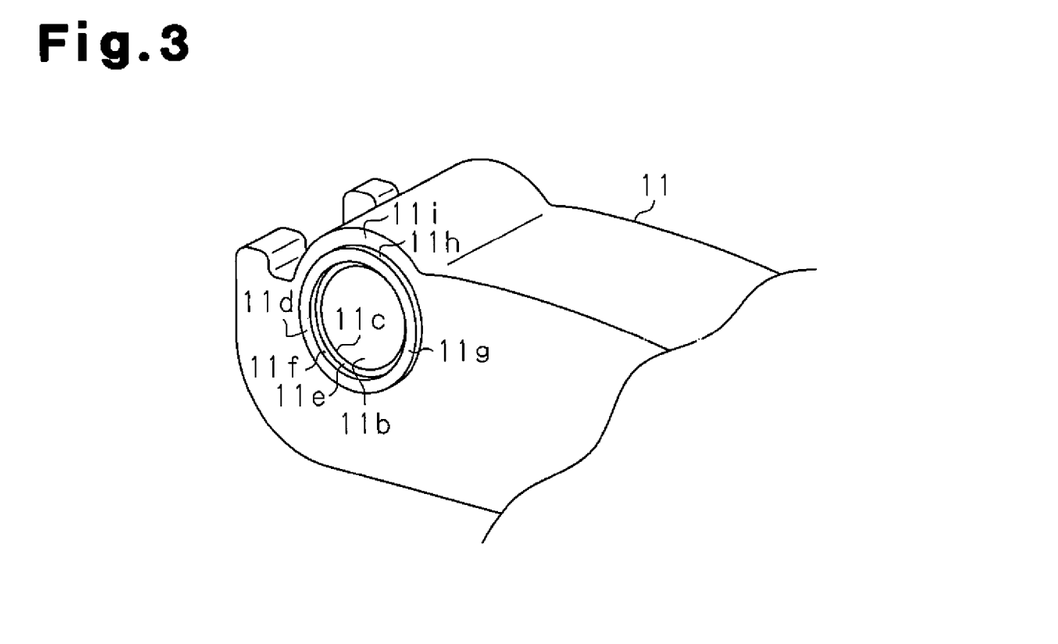
FIG. 3 is a partially enlarged perspective view showing the arm head of FIG. 1.

A shaft fixing hole 11a is formed in the basal portion of the arm head 11. The pivot shaft 2 is in inserted through and fixed to the shaft fixing hole 11a. As shown in FIGS. 2 and 3, the arm head 11 has a distal portion including a coupling bore 11b extending in a direction orthogonal to the longitudinal direction of the arm head 11. The coupling bore 11b includes open ends 11c that open toward the outer side of the arm head 11.

As shown in FIGS. 1 and 2, the retainer 12 has a basal portion, with respect to the longitudinal direction, including two coupling arms 12a. The two coupling arms 12a and a rivet 14, which serves as a shaft inserted through the coupling bore 11b, pivotally couples the retainer 12 to the arm head 11. The retainer 12 is pivotal about the rivet 14 in directions toward and away from the windshield, which serves as a wiping surface. Referring to FIG. 2, in the present embodiment, a tubular outer bushing 15 and inner bushing 16, which are formed of metal, are arranged between the wall of the coupling bore 11b and the rivet 14.

As shown in FIG. 2, the inner bushing 16 includes two end faces respectively projecting out of the open ends 11c of the coupling bore 11b and contacting inner surfaces of the two coupling arms 12a of the retainer 12. The outer bushing 15, which is shorter than the inner bushing 16, includes two end faces that do not contact the inner surfaces of the two coupling arms 12a. Each end face of the outer bushing 15 is flush with or projected outward from an outer surface 11d (radial outer surface) of a tubular portion 11g (annular projection) of the arm head 11, which will be described later.

Figure 4A:
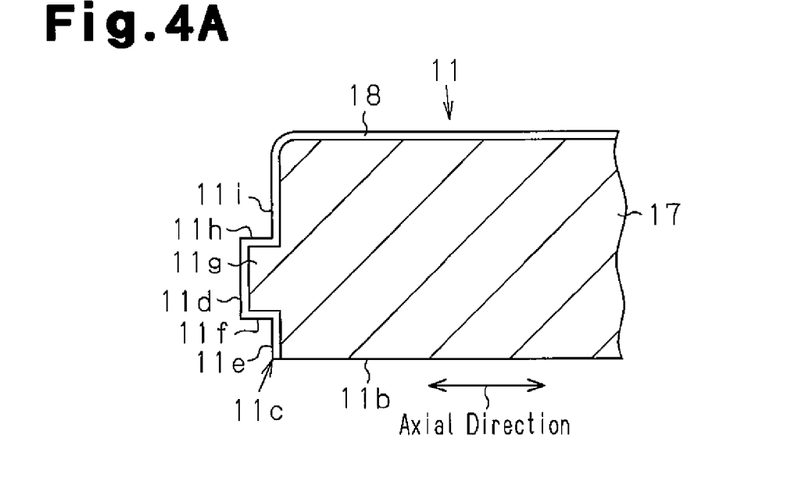
FIG. 4A is a partially enlarged cross-sectional view of the arm head of FIG. 1.

As shown in FIG. 4A, two annular surfaces, namely a first surface 11e and a second surface 11f, which form an annular recess, are arranged between each open end 11c and the corresponding outer surface 11d. In the present embodiment, the two surfaces (i.e., the first surface 11e and second surface 11f) are arranged at an angle of 90° with respect to each other in a cross-section taken along an axial direction of the coupling bore 11b. In this manner, the arm head 11 includes first and second surfaces 11e and 11f, around the open end 11c, forming an annular recess that extends continuously from the open end 11c. Further, the radial outer surface 11d extends outward in the radial direction from the annular recess. In the description hereinafter, the phrase of "cross-section taken along the axial direction" refers to a "cross-section taken along the axial direction of the coupling bore 11b".

Figure 4B:
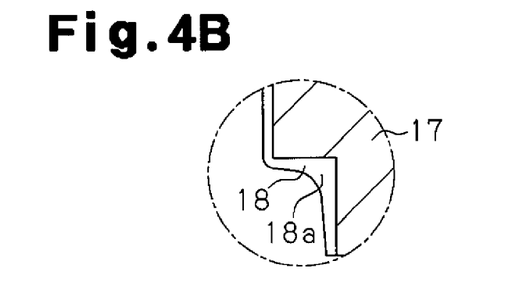
FIG. 4B is a partially enlarged cross-sectional view of FIG. 4A illustrating the thickness of a coating at a corner.

More specifically, as shown in FIGS. 4A and 4B, the arm head 11 of the present embodiment is formed by applying a coating to a main body 17, which is an aluminum die cast component. The surface of the arm head 11 excluding the wall of the coupling bore 11b is covered by a coating 18. The coating of the present embodiment is a resin coating of acryl, polyester, epoxy, or the like. In FIG. 4A, the coating 18 is schematically illustrated with an even thickness, and hatching lines are omitted to visually facilitate understanding. FIG. 4B illustrates the difference in the thickness of the coating 18. Specifically, the coating 18 is thick at a portion (inner angle portion) corresponding to where the two surfaces 11e and 11f interest at an angle of 90°. Hence, the coating 18 includes a thick portion 18a where the first surface 11e and the second surface 11f intersect with each other. The thick portion 18a is thicker than other parts of the coating 18. The thickness of the coating 18 varies on the two surfaces 11e and 11f. Thus, in strict terms, the angle between the two surfaces 11e and 11f is not 90°. However, in a state in which the coating 18 is removed (e.g., prior to the application of the coating 18), the angle between the two surfaces 11e and 11f is 90°. The coating 18 is not applied to the wall of the coupling bore 11b of the present embodiment. However, the wall of the coupling bore 11b is anodized to suppress corrosion.

The tubular portion 11g (annular projection) is arranged around each open end 11c of the arm head 11, and a top face of the tubular portion 11g defines the outer surface 11d. The two surfaces 11e and 11f are formed between the open end 11c and the radially inner edge of the outer surface 11d. In other words, the radial outer surface 11d is a top face of the tubular portion 11g (annular projection) arranged around each open end 11c, and the first and second surfaces 11e and 11f are arranged between the open end 11c and the radially inner edge of the radial outer surface 11d. Hence, the first surface 11e extends outward in the radial direction from the open end 11c and is located in the arm head 11 inward in the axial direction of the coupling bore 11b from the radial outer surface 11d. The second surface 11f extends from the first surface 11e to the radial outer surface 11d at an angle that is less than 180° with respect to the first surface 11e.

As shown in FIG. 4A, the first surface 11e, which is close to the coupling bore 11b, extends along a direction orthogonal to the axial direction of the coupling bore 11b in a cross-section taken along the axial direction. That is, the first surface extends from the open end 11c outward in the radial direction of the coupling bore 11b. The second surface 11f, which is close to the outer surface 11d, forms an inner circumferential surface of the tubular portion 11g and extends in the axial direction of the coupling bore 11b in a cross-section taken along the axial direction, that is, in a direction orthogonal to the first surface 11e.

Further, as shown in FIG. 4A, an outer circumferential surface 11h of the tubular portion 11g and a basal surface 11i of the tubular portion 11g are arranged at an angle of 90° with respect to each other in a cross-section taken along the axial direction.

The above embodiment has the advantages described below.

Figure 5:
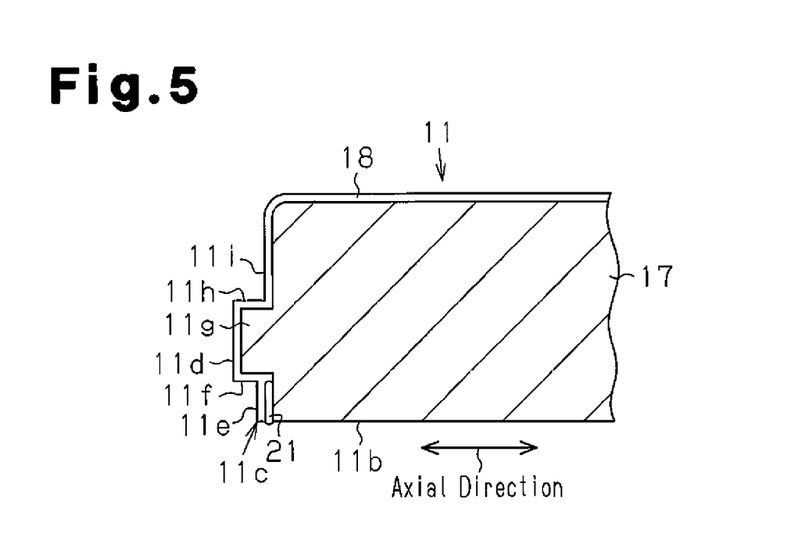
FIG. 5 is a partially enlarged cross-sectional view of the arm head.

(1) As shown in FIG. 5, for example, corrosion may occur inside the coating 18, specifically, at the edge of the coating 18 in the vicinity of the open end 11c. In the present embodiment, the arm head 11 includes the first and second surfaces 11e and 11f that form an annular recess. The annular recess extends continuously from the open end 11c, around the open end 11c. The arm head 11 also includes the radial outer surface 11d, which extends outward in the radial direction from the annular recess. The first surface 11e extends outward in the radial direction from the open end 11c and is located in the arm head 11 inward in the axial direction of the coupling bore 11b from the radial outer surface 11d. The second surface 11f extends from the first surface 11e to the radial outer surface 11d at an angle that is less than 180° (specifically, 90°) with respect to the first surface 11e. Thus, the direction of the force acting on the coating 18 when a corrosion product 21 separates the coating 18 from the main body 17 temporarily changes at the portion where the two surfaces 11e and 11f intersect each other. More specifically, the corrosion product 21 applies a separation force to the coating 18 of the first surface 11e in a direction perpendicular to the first surface 11e (so that the coating 18 is compressed). The corrosion product 21 also applies a shearing separation force to the coating 18 of the second surface 11f in a direction parallel to the second surface 11f. This suppresses and retards growth of the corrosion product 21. The thick portion 18a (see FIG. 4B) is formed where the two surfaces 11e and 11f intersect each other. Thus, the coating 18 has high rigidity at the thick portion 18a. This also suppresses growth of the corrosion product 21 and retards corrosion. Consequently, expansion (separation) of the coating 18 that would be caused by growth of the corrosion product 21 is retarded, and the outer appearance is not deteriorated prematurely.

(2) The first and second surfaces 11e and 11f are arranged relative to each other at an angle that is less than or equal to 90° (90° in the present embodiment). The corrosion product 21 advances along one of the surfaces, namely, the first surface 11e, and requires a large force along the shearing separation direction of the coating 18 where the two surfaces 11e and 11f intersect each other. This further retards advancement of the corrosion product 21 at where the two surfaces 11e and 11f intersect each other.

(3) The one of the two surfaces 11e and 11f closer to the outer surface 11d, namely, the second surface 11f, extends parallel to the axis of the coupling bore 11b. Thus, the direction in which the second surface 11f is removed from a mold is the same as the direction in which the coupling bore 11b is removed from a mold. Thus, the arm head 11 can be formed with fewer molds.

(4) The radial outer surface 11d is the top face of the tubular portion 11g (annular projection), which is arranged around each open end 11c. Thus, even if the corrosion product 21 advances beyond the two surfaces 11e and 11f and the outer surface 11d and proceeds towards the basal surface 11i at which the tubular portion 11g is arranged, the advancement of the corrosion product 21 is retarded where the outer circumferential surface 11h and the basal surface 11i of the tubular portion 11g intersect each other. This retards the advancement of expansion (separation) of the coating 18, which would be caused by advancement of the corrosion product 21, even where the outer circumferential surface 11h and the basal surface 11i of the tubular portion 11g intersect each other, and premature deterioration of the outer appearance is suppressed.

The above embodiment may be modified as described below.

The forms of the two surfaces 11e and 11f in the embodiment described above may be changed.

Figure 6:
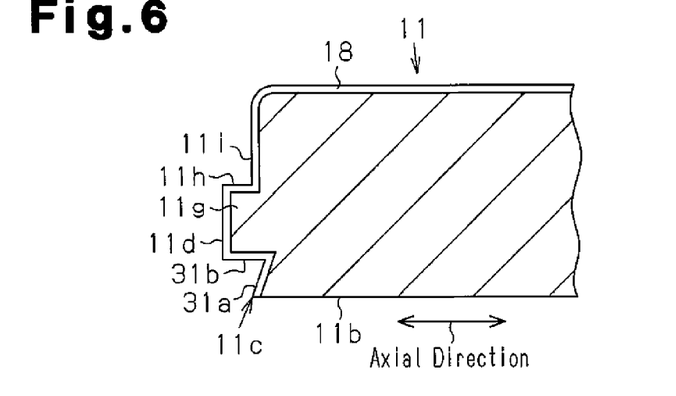
FIG. 6 is a partially enlarged cross-sectional view of an arm head in a further example.

For example, the two surfaces 11e, 11f may be changed as shown in FIG. 6. In the example of FIG. 6, two surfaces (first surface 31a and second surface 31b) are arranged relative to each other at an angle (acute angle) that is less than 90°. Specifically, the first surface 31a extends outward in the radial direction from the open end 11c at an angle (acute angle) that is less than 90° with respect to the axis of the coupling bore 11b in a cross-section taken along the axial direction. The second surface 31b, which forms an inner circumferential surface of the tubular portion 11g, extends along the axial direction of the coupling bore 11b in a cross-section taken along the axial direction.

This structure also obtains advantages (1) to (4) of the above embodiment. The two surfaces 31a and 31b are arranged at an acute angle relative to each other. Thus, in order for the coating 18 (expanded portion not shown) expanded by a corrosion product that has advanced along one of the surfaces, namely, the first surface 31a, a larger force in the shearing separation direction of the coating 18 must be applied to the other one of the surfaces, that is, the second surface 31b, for the corrosion product to further grow and advance beyond where the two surfaces intersect each other. Accordingly, the coating 18 is less likely to be separated at the second surface 31b. This further retards advancement of the corrosion product where the two surfaces 31a and 31b intersect each other.

Figure 7:
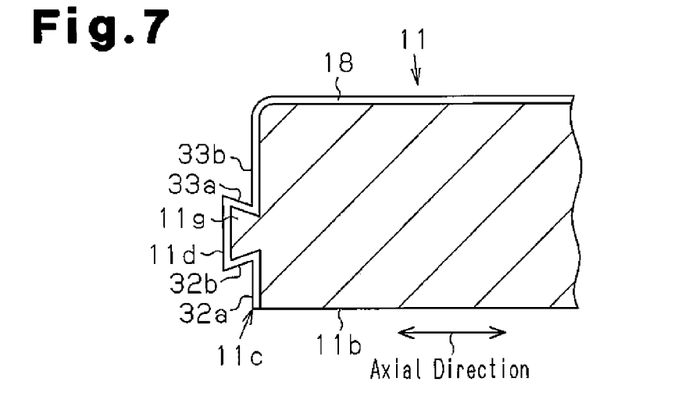
FIG. 7 is a partially enlarged cross-sectional view of an arm head in a further example.

The above embodiment may also be modified as shown in FIG. 7. In the example of FIG. 7, two surfaces (first surface 32a and second surface 32b) are arranged at an angle (acute angle) of less than 90° relative to each other. Specifically, the first surface 32a extends outward in the radial direction from the open end 11c in a direction orthogonal to the axial direction of the coupling bore 11b in a cross-section taken along the axial direction. The second surface 32b, which forms an inner circumferential surface of the tubular portion 11g, is inclined with respect to the axial direction of the coupling bore 11b so that the second surface 32b is arranged relative to the first surface 32a at an angle (acute angle) of less than 90° in a cross-section taken along the axial direction. In other words, the second surface 32b is inclined away from the coupling bore 11b in the radial direction of the coupling bore 11b as the second surface 32b extends into the coupling bore 11b from the outer surface 11d in the axial direction.

This structure also obtains advantages (1) and (2) of the above embodiment. The two surfaces 32a and 32b are arranged at an acute angle relative to each other. Thus, in order for the coating 18 (expanded portion not shown) expanded by a corrosion product that has advanced along one of the surfaces, namely, the first surface 32a, a larger force in the shearing separation direction of the coating 18 must be applied to the other one of the surfaces, that is, the second surface 32b, for the corrosion product to further grow and advance beyond where the two surfaces intersect each other. Accordingly, the coating 18 is less likely to be separated at the second surface 32b. This retards advancement of the corrosion product at where the two surfaces 32a and 32b intersect each other. In the example of FIG. 7, an outer circumferential surface 33a and a basal surface 33b of the tubular portion 11g are arranged at an angle (acute angle) that is less than 90° in a cross-section taken along the axial direction. Thus, in addition to advantage (4) of the above embodiment, the advancement of the corrosion product 21 at where the outer circumferential surface 33a and the basal surface 33b intersect each other is further retarded in the same manner as where the two surfaces 32a and 32b intersect each other.

Figure 8:
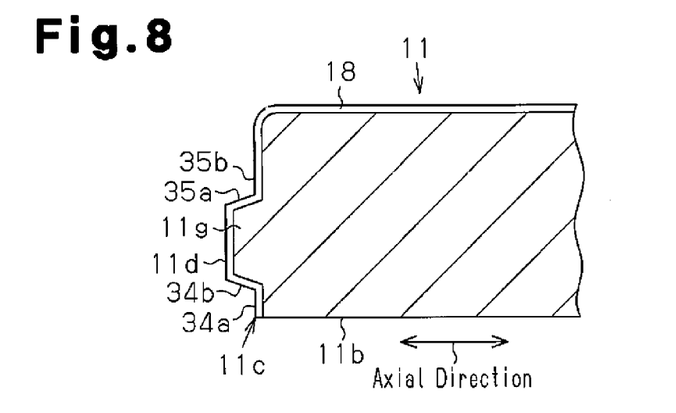
FIG. 8 is a partially enlarged cross-sectional view of an arm head in a further example.

The above embodiment may be modified as shown in FIG. 8. In the example of FIG. 8, two surfaces (first surface 34a and second surface 34b) are arranged at an angle (obtuse angle) of less than 180° and greater than 90°. Specifically, the first surface 34a extends outward in the radial direction from the open end 11c in a direction orthogonal to the axial direction of the coupling bore 11b in a cross-section taken along the axial direction. The second surface 34b, which forms an inner circumferential surface of the tubular portion 11g, is inclined with respect to the axial direction and arranged relative to the first surface 34a at an angle (obtuse angle) of less than 180° and greater than 90° in a cross-section taken along the axial direction. In other words, the second surface 34b is inclined toward the axis of the coupling bore 11b in the radial direction of the coupling bore 11b as the second surface 34b extends into the coupling bore 11b from the outer surface 11d in the axial direction. That is, the second surface 34b is inclined with respect to the axis of the coupling bore 11b and tapered from the radial outer surface 11d towards the first surface 34a.

This structure also obtains advantages (1) and (3) of the above embodiment. In the example of FIG. 8, an outer circumferential surface 35a and a basal surface 35b of the tubular portion 11g are arranged at an angle (obtuse angle) that is less than 180° and greater than 90° in a cross-section taken along the axial direction.

Figure 9:
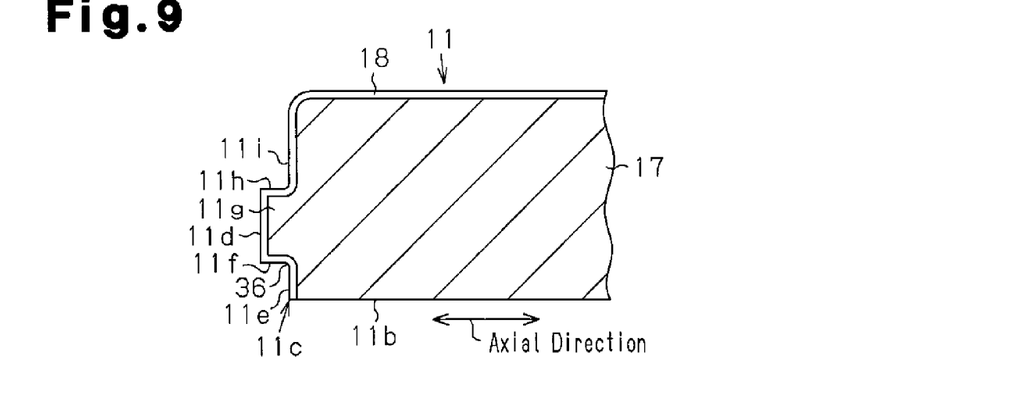
FIG. 9 is a partially enlarged cross-sectional view of an arm head in a further example.

As shown in FIG. 9, the two surfaces 11e and 11f of the above embodiment described above may be connected by a curved surface 36 (e.g., arcuate surface having an extremely small radius of curvature).

Figure 10:
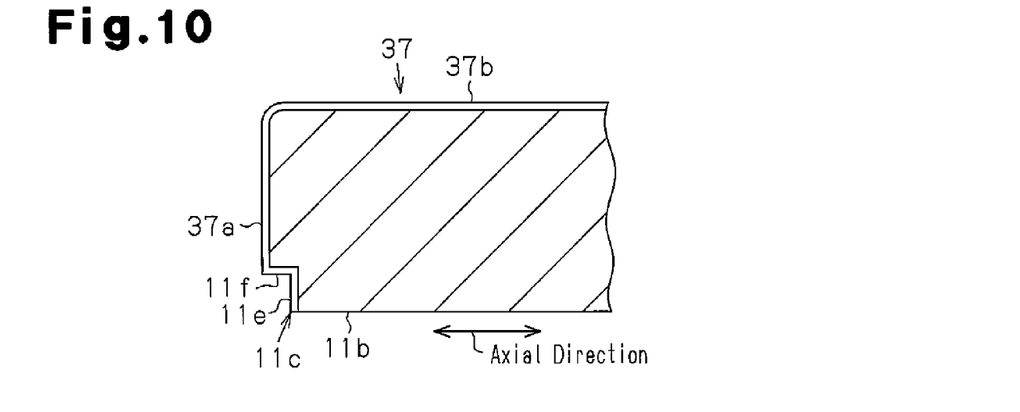
FIG. 10 is a partially enlarged cross-sectional view of an arm head in a further example.

In the embodiment described above, the outer surface 11d is the top face of the tubular portion 11g arranged around the open end 11c. The outer surface 11d only needs to be located outward in the radial direction of the coupling bore 11b from the open end 11c and be extended along the radial direction of the coupling bore 11b and may thus be changed as shown in FIG. 10 to an outer surface 37a. More specifically, the outer surface 37a in the example of FIG. 10 occupies most of the side surface of an arm head 37 and is continuous with an upper surface 37b of the arm head 37.

This structure also obtains advantages (1) to (3) of the above embodiment.

The outer surfaces 11d and 37a do not have to extend along the direction orthogonal to the axial direction of the coupling bore 11b in a cross-section taken along the axial direction. The outer surfaces 11d and 37a may extend along a direction inclined with respect to the direction orthogonal to the axial direction.

In the above embodiment, the coupling bore 11b in the arm head 11 has a fixed diameter in the axial direction but is not limited in such a manner. For example, as shown in FIG. 11, for example, an axial end region of the coupling bore 11b may include an increasing diameter portion 42 in which the diameter increases at a constant ratio towards the open end 41.

Figure 11:
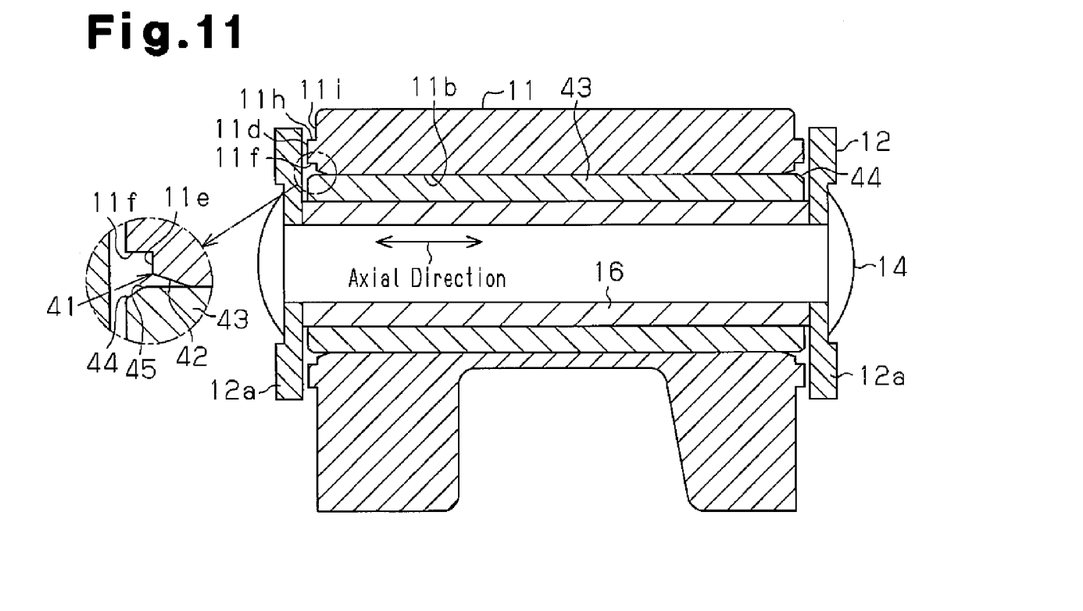
FIG. 11 is a cross-sectional view showing a coupling portion of an arm head and a retainer in another example.

In the example of FIG. 11, anodization is performed on the wall of the coupling bore 11b including the increasing diameter portion 42.

Figure 12A:
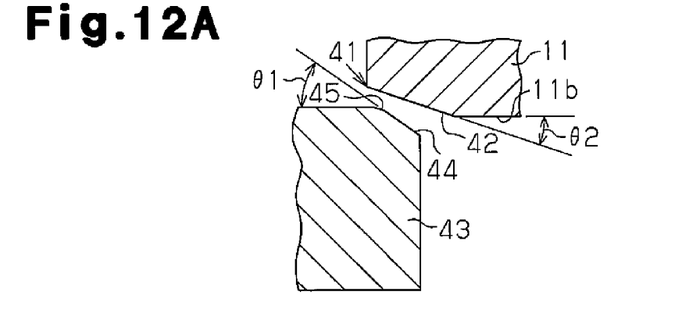
FIGS. 12A to 12C are partially enlarged cross-sectional views showing an arm head and an outer bushing that are coupled to each other in further examples.

An outer bushing 43 is inserted into the coupling bore 11b along the axial direction of the coupling bore 11b. The axial end region of the outer bushing 43 includes a decreasing diameter portion 44 in which the diameter decreases at a constant ratio towards the end face in the axial direction of the outer bushing 43. As shown in FIG. 12A, in a cross-section taken along the axial direction, a line extending along the insertion direction (direction in which the outer circumferential surface of the outer bushing extends) and a line extending along the decreasing diameter portion 44 intersect each other at an angle θ1. In the cross-section taken along the axial direction, a line extending along the axial direction of the coupling bore 11b and a line extending along the increasing diameter portion intersect each other at an angle θ2. The increasing diameter portion 42 and the decreasing diameter portion 44 are set so that the angle θ1 is greater than the angle θ2. In other words, an inclination angle θ1 of the decreasing diameter portion 44 with respect to the axis of the coupling bore 11b is greater than an inclination angle θ2 of the increasing diameter portion 42 with respect to the axis of the coupling bore 11b. The outer circumferential surface of the outer bushing 43 (outer circumferential surface of central part) and the decreasing diameter portion 44 are continuously connected by a curved portion 45 (fine curved portion) having a curved cross-sectional shape (arcuate cross-sectional shape). In other words, the bushing 43 includes the outer circumferential surface, which extends parallel to the axis of the bushing 43, and the curved portion 45, which connects the outer circumferential surface and the decreasing diameter portion 44. That is, the outer circumferential surface of the outer bushing 43 is continuously connected to the decreasing diameter portion 44 by the curved portion 45, which has a curved cross-sectional shape with a diameter that decrease toward the decreasing diameter portion 44.

Figure 12B:
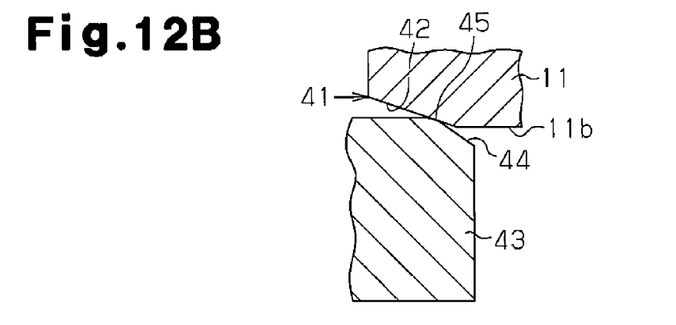
Figure 12C:
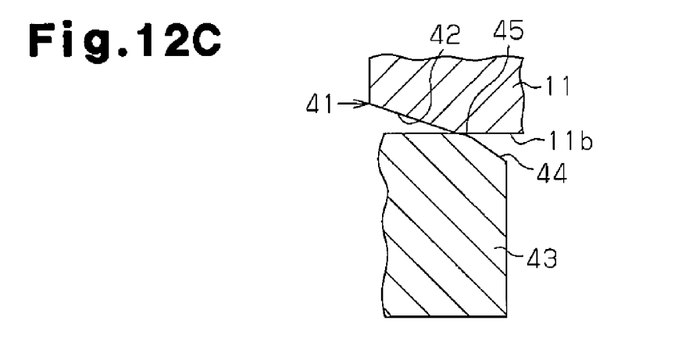

With such a structure, as shown in FIGS. 12A to 12C, the insertion (press-fitting) of the outer bushing 43 into the coupling bore 11b is facilitated since the increasing diameter portion 42 guides the outer bushing 43. Further, the outer bushing 43 comes into contact with the increasing diameter portion 42 during insertion (press-fitting) at the curved portion 45, which is a curved surface having round cross-section and not a sharp edge. Thus, the outer bushing 43 and the increasing diameter portion 42 (arm head 11) are unlikely to be scratched.

Figure 12D:
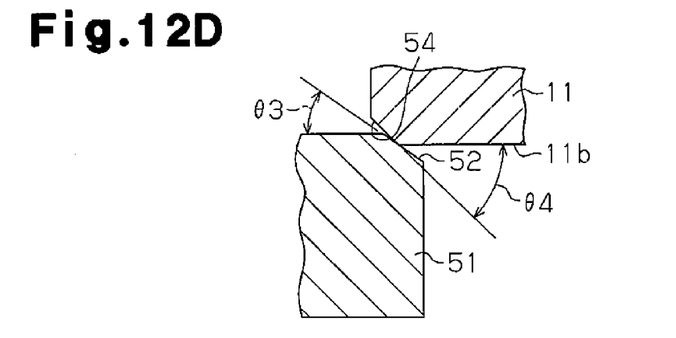
FIG. 12D is a partially enlarged cross-sectional view showing an arm head and an outer bushing in a comparative example.
Figure 13:
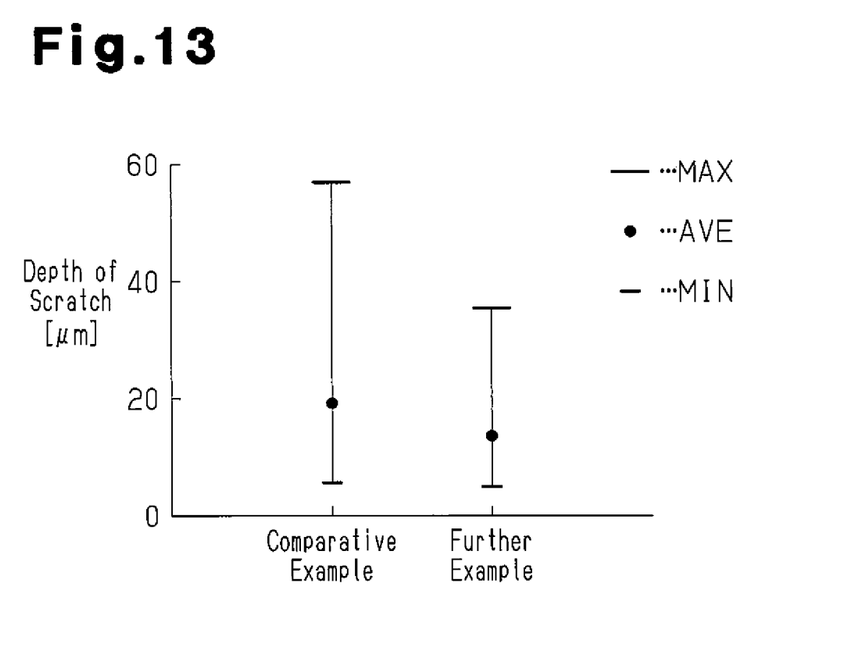
FIG. 13 is a graph comparing the depth of a scratch between the further examples and the comparative example.

Anodization of the coupling bore 11b forms an anode oxidization film on the wall of the coupling bore 11b. In the example of FIGS. 11 and 12A to 12C, even if scratches are produced in the wall of the coupling bore 11b (anode oxidization film) when the wiper arm 1 is assembled, the scratches would be shallow. FIG. 13 is a graph comparing the depth of scratches between the above example and a comparative example (see FIG. 12D). In the comparative example shown in FIG. 12D, a line extending along the insertion direction (outer circumferential surface of outer bushing 51) and a line extending along a decreasing diameter portion 52 intersect each other at an angle θ3 in a cross-section taken along the axial direction. A line extending along the axial direction of the coupling bore 11b and a line extending along an increasing diameter portion 54 intersect each other at an angle θ4 in a cross-section taken along the axial direction. The increasing diameter portion 54 and the decreasing diameter portion 52 are set so that the angle θ3 is less than the angle θ4. Further, the outer bushing 51 does not include the curved portion 45. FIG. 13 shows the depth of scratches produced in the anode oxidization film when the outer bushings 43 and 51 are coupled to the arm head 11 repetitively for thirty times with the example of FIGS. 11 and 12A to 12C and the comparative example of FIG. 12D. The depth of scratches in the experimental result of the comparative example is approximately 20 μm in average (AVE), approximately 57 μm at maximum (MAX), and approximately 6 μm at minimum (MIN). In contrast, in the example of FIGS. 11 and 12A to 12C, the depth of scratches is approximately 13 μm in average (AVE), approximately 36 μm at maximum (MAX), and approximately 4 μm at minimum (MIN). Thus, in the example of FIGS. 11 and 12A to 12C, the scratches produced during the assembly process in the coupling bore 11b (anode oxidization film) including the increasing diameter portion 42, which is anodized, have decreased depths and are shallow. This suppresses corrosion resulting from such scratches. Further, a corrosion product produced from a scar would be prevented from advancing towards the open end 41 and the coating. As a result, the deterioration in the outer appearance prematurely can be suppressed.

In the above embodiment, the rivet 14 is used as a shaft. The rivet 14 may be changed to a different type of shaft having a similar function.

In the above embodiment, the end faces of the inner bushing 16 projects out of the coupling bore 11b from the two open ends 11c and come into contact with the inner surfaces of the two coupling arms 12a of the retainer 12. In other words, the projecting amount (axial length of the inner bushing 16) of the inner bushing 16 is set so that the outer surfaces 11d and 37a of the tubular portion 11g does not come into contact with the inner surfaces of the two coupling arms 12a of the retainer 12. This prevents separation of the coating 18 that would be caused by friction between the inner surface of the coupling arm 12a of the retainer 12 and the outer surfaces 11d and 37a of the arm head 11 when the retainer 12 pivots with respect to the arm head 11.

The invention is not limited to the foregoing embodiments and various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

The invention claimed is:

1. An arm head comprising a longitudinal end portion to which a retainer is pivotally coupled and a surface covered by a coating, wherein:
   the end portion includes a coupling bore, wherein the retainer is pivotal relative to the arm head about an axis of a shaft extending through the coupling bore, and the coupling bore includes an open end that opens outward from the arm head;
   the arm head includes first and second surfaces forming an annular recess around the open end and a radial outer surface, wherein the annular recess extends continuously from the open end, and the radial outer surface extends outward in a radial direction from the annular recess;
   the first surface extends outward in the radial direction from the open end and is located in the arm head inward in an axial direction of the coupling bore from the radial outer surface;
   the second surface extends from the first surface to the radial outer surface at an angle less than 180° with respect to the first surface;
   the coating includes a thick portion where the first surface and the second surface intersect each other; and
   the thickness of the thick portion is greater than that of other parts of the coating.

2. The arm head according to claim 1, wherein the first and second surfaces are arranged relative to each other at an angle that is less than or equal to 90°.

3. The arm head according to claim 2, wherein the first and second surfaces are arranged relative to each other at an acute angle.

4. The arm head according to claim 1, wherein
   the second surface extends parallel to an axis of the coupling bore or is inclined with respect to the axis of the coupling bore to form a taper from the radial outer surface towards the first surface.

5. The arm head according to claim 1, wherein
   the radial outer surface is a top face of an annular projection arranged around the open end, and
   the first and second surfaces are arranged between the open end and a radially inner edge of the radial outer surface.

6. The arm head according to claim 1, wherein the coupling bore includes an axial end region defining an increasing diameter portion of which the diameter increases toward the open end.

7. The arm head according to claim 6, further comprising a bushing inserted between the shaft and a wall of the coupling bore, wherein the bushing includes an axial end region defining a decreasing diameter portion of which diameter decreases toward an end face in an axial direction of the bushing.

8. The arm head according to claim 7, wherein the diameter of the increasing diameter portion increases at a constant ratio toward the open end, and the diameter of the decreasing diameter portion decreases at a constant ratio towards the end face of the bushing.

9. The arm head according to claim 7, wherein
   the decreasing diameter portion is arranged at an inclination angle with respect to the axis of the coupling bore,
   the increasing diameter portion is arranged at an inclination angle with respect to the axis of the coupling bore, and
   the inclination angle of the decreasing diameter portion is greater than the inclination angle of the increasing diameter portion.

10. The arm head according to claim 7, wherein the bushing includes
    an axis,
    an outer circumferential surface extending parallel to the axis of the bushing, and
    a curved portion connecting the outer circumferential surface and the decreasing diameter portion.

11. The arm head according to claim 6, wherein a wall of the coupling bore, including the increasing diameter portion, is anodized.

12. The arm head according to claim 1, wherein said other parts are portions of the first surface and the second surface other than the thick portion.

13. An arm head covered by a coating and pivotally coupled by a shaft to a retainer, wherein the arm head includes a coupling bore into which the shaft is fitted, and the coupling bore includes an open end that opens outward from the arm head, the arm head comprising:
    annular first and second surfaces forming an annular recess around the open end, wherein the annular recess is continuously from the open end; and
    a radial outer surface extending outward in a radial direction from the annular recess, wherein
    the first surface extends outward in the radial direction from the open end and is located in the arm head inward in an axial direction of the coupling bore from the radial outer surface,
    the second surface extends from a radially outer edge of the first surface to a radially inner edge of the radial outer surface at an angle less than 180° with respect to the first surface, and
    the coating includes a thick portion where the first surface and the second surface intersect each other; and
    the thickness of the thick portion is greater than that of other parts of the coating.

14. The arm head according to claim 13, wherein said other parts are portions of the first surface and the second surface other than the thick portion.

\* \* \* \* \*